J. PARKER.
Draft Equalizers.

No. 141,813.

Patented August 12, 1873.

WITNESSES.

INVENTOR
John Parker
Hill & Ellsworth
By
His Attorneys.

UNITED STATES PATENT OFFICE.

JOHN PARKER, OF PONTIAC, ASSIGNOR OF ONE-HALF HIS RIGHT TO JAMES A. HUBBS, OF CATO, MICHIGAN.

IMPROVEMENT IN DRAFT-EQUALIZERS.

Specification forming part of Letters Patent No. 141,813, dated August 12, 1873; application filed June 21, 1873.

*To all whom it may concern:*

Be it known that I, JOHN PARKER, of Pontiac, in the county of Oakland and State of Michigan, have invented a new and Improved Three-Horse Whiffletree; and I do hereby declare the following to be a full, clear, and exact description of the same, reference being had to the accompanying drawing forming part of this specification, in which—

Figure 1:
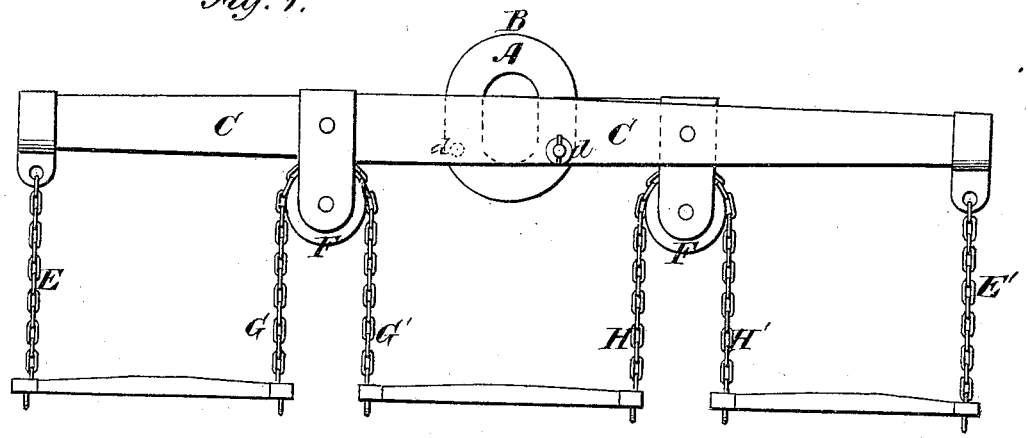
Figure 2:
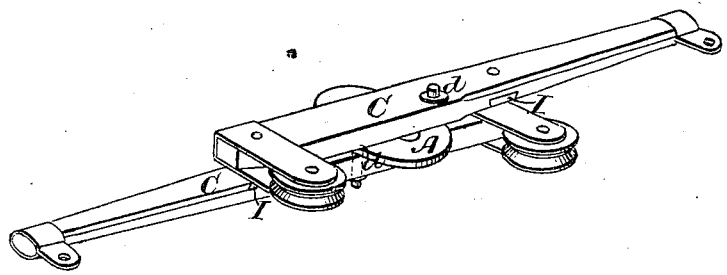

Figure 1 is a top-plan view of my improved whiffletree; and Fig. 2, a perspective view, showing the eccentric evener and the chafing-plates.

Similar letters of reference in the accompanying drawings denote the same parts.

My invention has for its object to provide for public use a three-horse evener, which shall equalize the draft upon the horses in a more simple and efficient manner than those now in use. To this end the invention consists, first, in the employment of two short whiffletrees combined to form a compound lever of the second order, in connection with an eccentric evener, draft-chains being attached to the compound lever in such a manner as to distribute the draft equally between the three horses. It consists, secondly, in providing the whiffletree with chafing-plates to prevent the wood from wearing by frictional contact; and, lastly, in the arrangement of the draft-chains with respect to each other and the whiffletrees, as I will now proceed to describe.

In the accompanying drawings, A is the evener, made in the form of an eccentric and adapted at the point B for attachment to a vehicle or plow. C C are the whiffletrees, arranged one above and the other below the eccentric evener, and pivoted to the same at opposite points, $d$ $d$, so that their short arms shall overlap each other, as shown. By this connection the oscillations of the whiffletrees take place upon opposite sides of the line of draft. E E' are single draft-chains, secured by convenient means to the outer ends of the long arms of the whiffletrees. The inner ends of the short arms are provided in any suitable manner with pulleys F, around which are passed double draft-chains, as shown. The ends of these chains, lettered in the one G G' and in the other H H', form separate points of attachment for the traces of the harness. The traces of the middle horse are attached, respectively, to the ends G' H of the double chains. The traces of the horse upon the right are attached to the end G of the double chain, and the end of the single chain E, while those of the horse upon the left are attached to the end H' of the double chain and the end of the single chain E'.

This arrangement of the chains equalizes the draft of the three horses, as follows: The right draws against the left horse through the chain E, the lower whiffletree, and the end H' of a double chain, while the left draws against the right horse through the chain E', the upper whiffletree, and the end G of a double chain. The draft between these two is therefore equal. The two outer horses also draw against the middle one, through the double chains, but the latter is assisted by each outer horse in drawing against the others, for while he is pulling against the two they are pulling against each other. This result is due to the method of pivoting the two whiffletrees to the eccentric, which, it will be observed, divides the compound lever into three equal parts. I I are metal plates let transversely into the proximate faces of the whiffletrees, so as to bear against the metal straps which carry the rollers F. By this provision chafing-plates are formed to prevent the roller-straps from wearing the wood of the whiffletrees as the latter oscillate.

Having thus described my invention, what I claim is—

1. The three-horse whiffletree, consisting of the two short whiffletrees pivoted to the eccentric evener, substantially as described, for the purpose specified.

2. The single and double draft-chains, arranged to operate in connection with the whiffletree, in the manner described, for the purpose specified.

3. The chafing-plates I, in combination with the whiffletrees and pulley-straps, substantially as described, for the purpose specified.

JOHN PARKER.

Witnesses:
   JOS. E. SAWYER,
   FRANK O. DEA.